United States Patent [19]
Aslanidis et al.

[11] Patent Number: 5,793,324
[45] Date of Patent: Aug. 11, 1998

[54] TRANSPONDER SIGNAL COLLISION AVOIDANCE SYSTEM

[75] Inventors: Konstantin O. Aslanidis, Dachau; Herbert Meier, Moosburg; Andreas Hagl, Dachau, all of Germany

[73] Assignee: Texas Instruments Incorporated, Dallas, Tex.

[21] Appl. No.: 588,657

[22] Filed: Jan. 19, 1996

[51] Int. Cl.$^6$ .................................................. G01S 13/75
[52] U.S. Cl. .................................. 342/51; 342/42; 342/44
[58] Field of Search ............................... 342/42, 44, 51, 342/30, 40

[56] References Cited

U.S. PATENT DOCUMENTS

| | | | |
|---|---|---|---|
| H1606 | 11/1996 | Gelnovatch et al. | 340/505 |
| 3,801,980 | 4/1974 | Danton et al. | 342/45 |
| 4,364,043 | 12/1982 | Cole et al. | 340/825.54 |
| 5,294,931 | 3/1994 | Meier | 342/44 |
| 5,410,315 | 4/1995 | Huber | 342/42 |
| 5,434,572 | 7/1995 | Smith | 342/44 |
| 5,450,070 | 9/1995 | Massar et al. | 340/825.54 |
| 5,453,747 | 9/1995 | D'Hont et al. | 342/42 |
| 5,457,461 | 10/1995 | Schuermann | 342/42 |
| 5,489,908 | 2/1996 | Orthmann et al. | 342/42 |
| 5,500,651 | 3/1996 | Schuermann | 342/42 |
| 5,521,602 | 5/1996 | Carroll et al. | 342/50 |
| 5,526,357 | 6/1996 | Jandrell | 370/95.2 |
| 5,534,856 | 7/1996 | Cadman | 340/825.34 |
| 5,550,548 | 8/1996 | Schuermann | 342/42 |
| 5,552,789 | 9/1996 | Schuermann | 342/42 |
| 5,557,280 | 9/1996 | Marsh et al. | 342/44 |
| 5,594,448 | 1/1997 | D'Hont | 342/44 |
| 5,602,538 | 2/1997 | Orthmann et al. | 340/825.54 |
| 5,602,919 | 2/1997 | Hurta et al. | 380/24 |
| 5,619,207 | 4/1997 | D'Hont | 342/42 |
| 5,621,412 | 4/1997 | Sharpe et al. | 342/51 |

*Primary Examiner*—John B. Sotomayor
*Attorney, Agent, or Firm*—Rebecca Mapstone-Lake; Richard A. Stoltz; Richard L. Donaldson

[57] ABSTRACT

Transponder signal collision avoidance system incudes a reader and wireless HDX or FDX type transponders (A, B) are disclosed, interrogated by the reader (R) by alternately powering and then reading through cycles corresponding to a number of possible transponders in the interrogation field. The cycles, which include reader power pulses, signify addresses of respective possible transponders, whether in or out of the field. The transponders for this purpose count reader power pulses by end-of-burst detection, increasing a stored count value with each reader power pulse. The transponder responds to the reader by transmission if and only if a stored count value in a read cycle matches a respective transponder address, preventing the transponders from transmitting telegrams interfering with each other. As a method of reader-transponder operation, the collision avoidance scheme thus cycles the reader interrogating through cycles having power pulses according to possible transponders in the field, not only calling the addresses of each of respective possible transponders but also shortening or lengthening read and power steps dependent upon responses received from the transponders.

21 Claims, 4 Drawing Sheets

5,793,324

1

TRANSPONDER SIGNAL COLLISION AVOIDANCE SYSTEM

BACKGROUND OF THE INVENTION

1. Field of the invention

The invention relates to transponder signal collision avoidance technology and, more particularly, to a system for preventing message signal collision of multiple wireless transponders in a wireless interrogation field from interfering with identification of the respective transponder messages, i.e., their so-called telegrams. Accordingly, the proposed transponder collision avoidance system avoids telegram collision with attendant advantages.

2. Related Art

Self-contained, miniaturized transponders, i.e., radio transponders, are known that employ an interrogator-transponder arrangement which may be independently powered, e.g., having an EEPROM data storage device and a transponder charge capacitor used as an energy accumulator charged by the energy of radio frequency interrogation to thereby power the transponder. Such a transponder arrangement is disclosed in Schuermann et al. U.S. Pat. No. 5,053,774, herein incorporated by reference.

Such transponders each transmit their radio telegrams upon being interrogated by a so-called reader. The wireless transmission of a transponder, e.g., as may convey serial number or address and any of a variety of parameters such as temperature or pressure, or other data, may herein be termed a telegram.

In a system employing multiple such transponders which may be miniaturized, independent, low cost and of relative simplicity, the transponders are not able to communicate with each other to avoid interference so that collision of their respective so-called telegrams may result, such that it may be impossible for the reader to distinguish their respective telegrams. Such a problem may arise when, after the interrogation signal of the reader, the transponders all initiate their telegram at the same time. Thus, it is desired to allow the transponders in the interrogation field to transmit their respective telegrams successively without mutual interference and without excessive loss of time.

Multiple possible solutions may exist to overcome the collision problem. One such proposed solution uses a comparison between a selective address and the content of a transponder memory to avoid response of an unaddressed transponder, in which transponder the transponder charge capacitor is discharged and therefore oscillation is stopped before the transponder can transmit. A disadvantage in the latter approach is that each transponder must be addressed separately, which requires considerable time and so degrades throughput; and moreover the respective transponder addresses must be completely known so that only a preselected transponder will be caused to respond.

SUMMARY OF THE INVENTION

It is in view of the above problems that the present invention is proposed. The present invention contemplates initiating in the multiple transponders a predetermined transmission delay interval for the respective transponder so that the data telegrams of the multiple transponders provide transmission of telegrams successively without mutual interference and without excessive loss of time.

Among the several advantages and features of the invention may be noted the provision of an improved transponder anti-collision system which is suitable for either half-duplex

2

(HDX) transponder systems or full-duplex (FDX) transponder systems using any type of modulation.

As a further advantage, the reader of such a system can be compatible with the existing installations, so that a reader configured according to the present system proposal can read existing transponders as well as transponders configured according to the present system proposal for avoiding interrogation telegram collision.

A still further advantage is that transponders of the system are readily configured in accordance with the proposed system, requiring only simple circuit additions to existing transponder circuitry to achieve the modes of operation herein proposed.

Briefly, an inventive transponder signal collision avoidance system comprises reader and a plurality of wireless transponders for being interrogated by the reader within a wireless interrogation field, the reader being adapted for interrogating through a number of cycles corresponding to a number of possible transponders in the field, the cycles include power pulses by which the transponders receive power for responding, and which power pulses signify addresses of each of respective possible transponders. The transponders for this purpose count reader power pulses, increasing a predetermined value, i.e., a stored bit pattern, with each reader power pulse. The transponders are each adapted to respond to the reader by transmission only in response to a received transmission value corresponding to the address of the respective transponder, whereby to prevent the transponders from transmitting respective messages without interfering with each other.

Thus, the system carries out a method of wireless reader-transponder operation for transponder signal collision avoidance comprising providing a reader and a plurality of wireless transponders for being interrogated by the reader within a wireless interrogation field, cycling the reader interrogating by transmitting power pulses through a plurality of cycles of interrogation of possible transponders in the field, the cycles calling the addresses of each of respective possible transponders, causing the transponders each to respond to the reader by transmission only in response to a received address of the respective transponder, whereby to prevent the transponders from transmitting respective messages without interfering with each other.

Other advantages, objects and features will be apparent or are pointed out herein.

BRIEF DESCRIPTION OF DRAWINGS

FIGS. 4A and 4B are interrelated flow charts together showing steps in the operation of a reader and typical transponder of the system, wherein:

FIG. 4A is termed the reader flow chart and shows steps in the operation of a reader of the system operating according to system requirements; and FIG. 4B is termed the transponder flow chart and shows steps in the operation of a typical transponder configured according to FIG. 2.

Corresponding reference characters identify corresponding elements throughout the several views of the drawings.

DESCRIPTION OF INVENTIVE EMBODIMENTS

Figure 1:
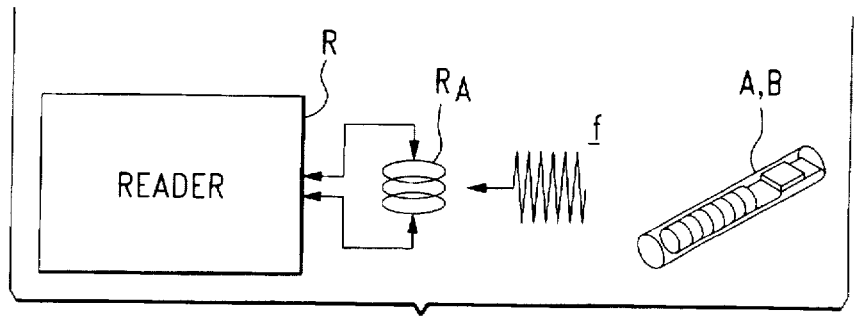
FIG. 1 is a block diagram operation of a system in accordance with the invention.

Referring to the drawings, FIG. 1 shows a block diagram of a wireless interrogation system of the half-duplex (HDX) type generally disclosed in above-cited Schuermann et al. U.S. Pat. No. 5,053,774 including an interrogator-reader (reader) R and its antenna $R_A$ by which one miniaturized transponder A,B as typical of others in field f is interrogated by reader R and FSK-modulated data may be read from the transponder by the reader according to known technique, with the transponder powered by RF from antenna $R_A$.

Figure 2:
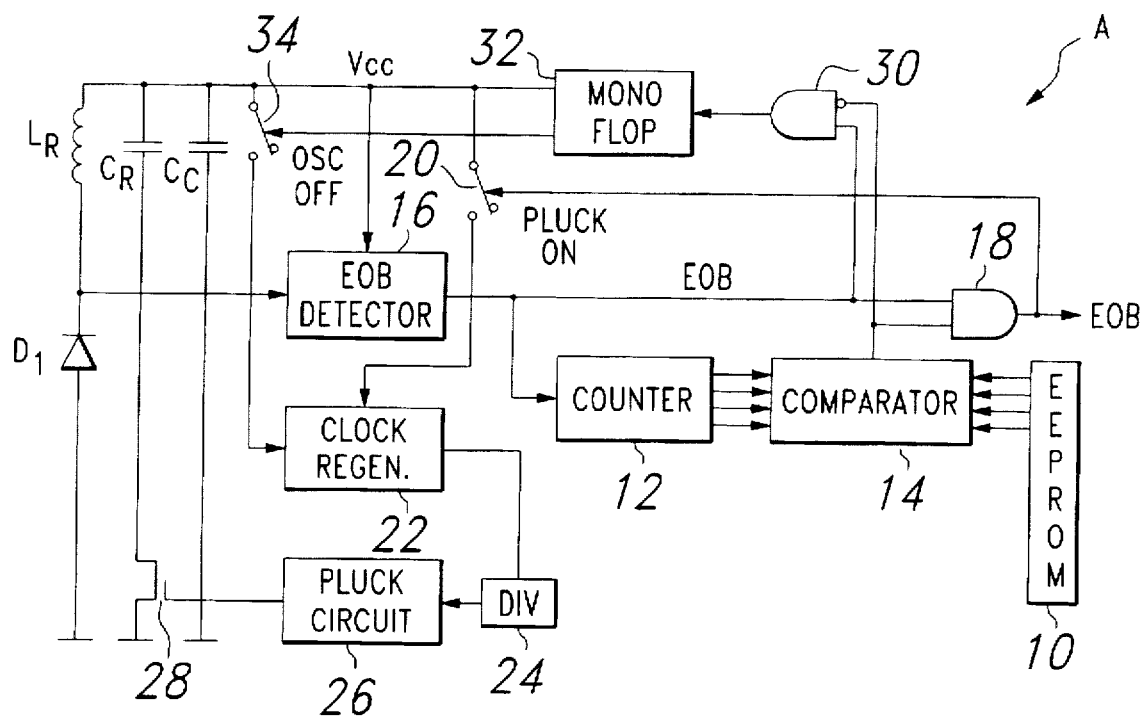
FIG. 2 is a block diagram of the configuration of an HDX transponder as modified in accordance with the invention to provide the proposed collision-avoidance mode of operation.

Referring to FIG. 2, an HDX transponder A includes a resonant circuit comprising an inductor $L_R$ and a capacitor $C_R$ for both receiving an interrogation signal and for transmitting a response. Inductor $L_R$, being of very compact dimensions, serves as an antenna of the transponder for receiving and transmitting.

Transponder A is representative of each of several transponders $A_1, A_2 \ldots A_n$ in field f to be interrogated by an interrogator, i.e., a reader (not shown) in accordance with the teachings of U.S. Pat. No. 5,053,774. It will be understood that each of the transponders in a wireless interrogation field carries a unique identification, namely a unique bit pattern constituting a preset value, as representing the "address" of the respective transponder. By such addresses, the transponders and reader are preventing from interfering with identification of the respective transponder messages, i.e., their so-called telegrams, by transmitting only if the address is received and thereby preventing transponder telegram collision.

When interrogated, each transponder, being provided with a diode $D_1$ clamping one side of the resonant circuit to circuit ground, stores charge in a charge capacitor $C_C$ from received radio frequency energy for so long as the interrogation signal is received, e.g., for a period of milliseconds. As will be seen from the following description the resultant charge in capacitor $C_C$ provides the sole source of power for operation of the transponder, and representing a stored voltage Vcc.

Transponder A also includes an EEPROM 10 containing a unique bit pattern, herein referred to as a preset value, and meaning a number of predetermined EEPROM bits representing the address of the transponder, and in accordance with the inventive improvement is provided with a counter 12 for counting reader power pulses, the counter increasing a predetermined value (bit pattern), and storing this count value for a period of one read cycle. It will be compared with the preset value, namely the transponder address, of the EEPROM by a comparator 14.

As will be known to those skilled in the art, in such HDX wireless mode both interrogation transmission and transponder response will be carried out sequentially, typically on the same frequency. Accordingly, circuit provision is made within each transponder for determining the end of each transmission burst by the reader. Specifically, at 16 is designated an end-of-burst (EOB) detector, powered by Vcc, is responsive to H-L (high-to-low) transition of the received burst during an interrogation cycle and upon H-L power transition generates an EOB trigger signal to counter 12 and also to an AND gate 18. If the latter receives a match signal from comparator 14, the AND gate will provide an end-of-burst (EOB) signal to a semiconductor switch 20, as realized in integrated circuitry of the apparatus, so as to provide Vcc to an clock regenerator circuit 22 of the apparatus. The latter circuit then provides an output to a clock divider 24 which is configured accordingly to drive a pluck circuit 26, in turn driving a unijunction transistor or other suitable semiconductor switch 28 having its main electrodes between circuit ground and the resonant circuit, and thus, as gated on or off, causing resonance to be initiated and with transmission accordingly responsive to interrogation. Data as characteristic of that stored permanently or temporarily in EEPROM 10 also may be clocked out during transmission.

Provision is included for preventing transmission if the transmitted bit pattern, namely a transponder sequence value of the interrogation signal, does not match the preset value of the EEPROM when compared by comparator 14. When the value does not match, as in the case of each of the transponders of the set except that being interrogated, a further AND gate 30 receiving as one input EOB and having its other input inverted and receiving the output of comparator 14, so that the output of gate 30 is high in the absence of a match. The high output triggers a monoflop 32 to provide an oscillation-off signal OSCOFF to another semiconductor switch 34 for interrupting operation of clock regenerator 22 to effectively short circuit the resonant circuit and stop further oscillation, inactivating the pluck circuit 26.

Modification of an existing HDX transponder configuration of the system includes the augmentation of counter 12, comparator 14 gates 18 and 30, and monoflop 32 and adaption of these elements to the circuitry with resultant new combination of features and new modes of operation.

Figure 3:
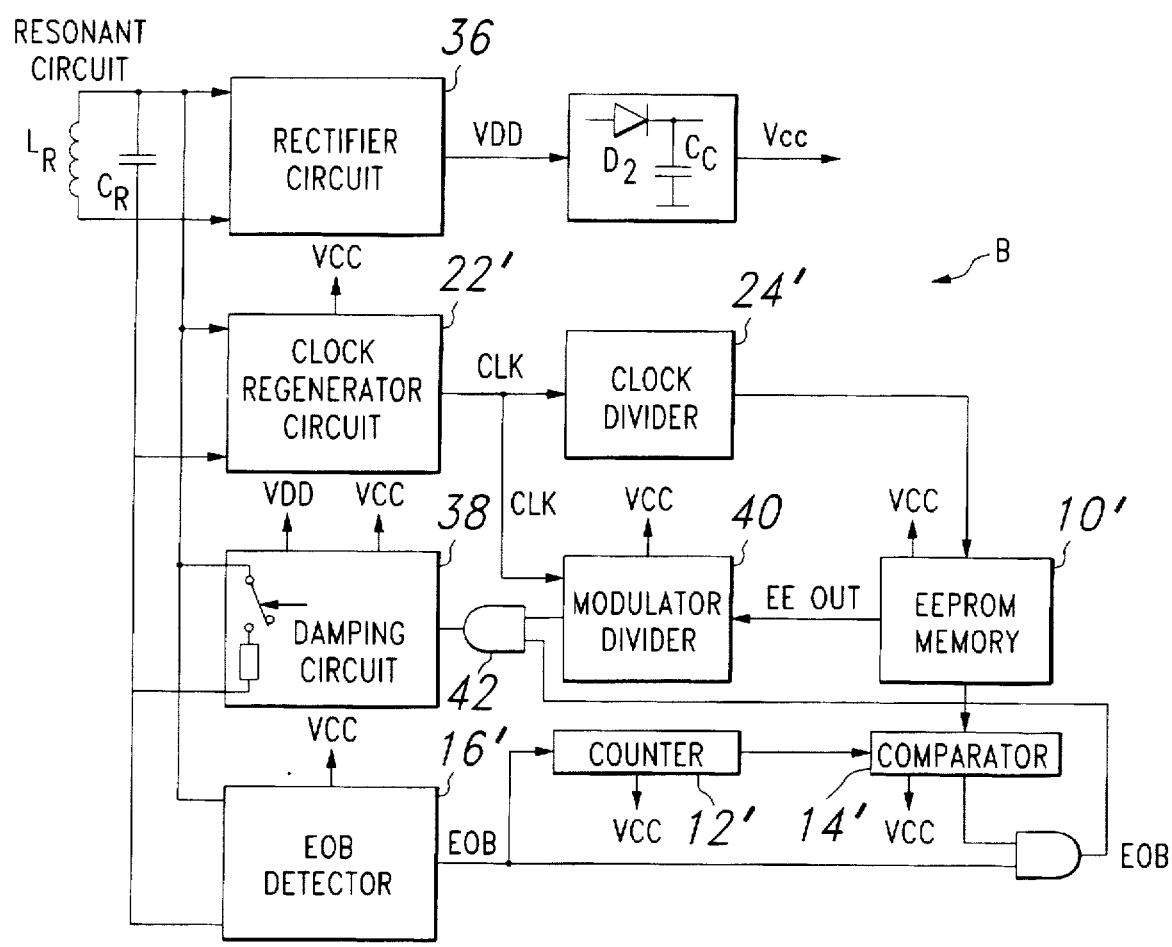
FIG. 3 is a block diagram of the configuration of an FDX transponder as modified in accordance with the invention to provide the proposed collision-avoidance mode of operation.

Referring to FIG. 3, a full-duplex (FDX) transponder generally of the type identified above, here designated B, similarly includes a resonant circuit having an inductor $L_R$ and a capacitor $C_R$ for both receiving an interrogation signal and for transmitting a response. Transponder B is similarly one of a plurality intended to be interrogated by a reader (not shown).

Those skilled in the art understand that full-duplex wireless mode of operation may permit the reader and the transponders to operate on different frequencies to permit interrogation transmission and transponder response to occur on the different frequencies and wherein a transponder may receive interrogation on one frequency by means of its resonant circuit which then may be electronically retuned for interrogation response transmission to the reader.

The resonant circuit is in any event connected across a rectifier circuit 36 providing a voltage $V_{DD}$ at resonance through a diode $D_2$ for accumulating charge in charge capacitor $C_C$ from received radio frequency energy which thereby supplies voltage Vcc for operation.

Connected also across the resonant circuit are EOB detector 16', clock regenerator circuit 22' and a damping circuit 38.

Clock regenerator circuit 22' provides a clock signal CLK to clock divider 24' and also to a modulator circuit 40. The clock divider provides its output to EEPROM 10.

Counter 12' stores a bit pattern corresponding to the number of reader power pulses of the interrogation signal, providing a stored count value. Comparator 14' compares the count value in counter 12' with the address value of EEPROM 10'. If there is a match, an output is provided by the comparator to AND gate 18', whose output EOB* is provided to an input of a further AND gate 42 which receives its other input from modulator 40 which in turns receives the data output EEOUT of EEPROM 10'.

Modification of such system's FDX transponder configuration to bring about the new combination of features and new modes of operation includes the augmentation and adaption of counter 12', comparator 14', gates 18' and 42.

The system, whether HDX or FDX in operation, may consist of at least a reader and a plurality of possible transponders. The system is configured so that the reader is able to read, e.g., 2, 4, 8 or 16 transponders which are all in the same interrogation field. Thus the system necessarily provides, e.g., for 1-, 2-, 3- or 4-bit resolution, respectively, in the addresses, i.e., identities of its transponders.

Figure 5:
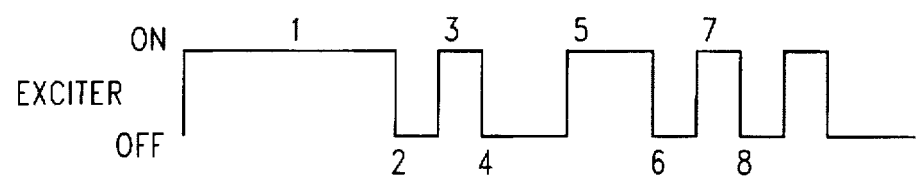
FIG. 5 is an exemplary reader timing diagram.

Referring to FIG. 5, operation will be better understood.

The reader starts with a power-up sequence (e.g., 50 ms) during which all transponders are charged up (i.e., their charge capacitors $C_C$ accumulate charge) and are then ready to transmit their data (FIG. 5 phase 1).

In each transmitter, the outputs of counter 12 are connected to bit comparator 14. Each transponder counter is increased by a count of 1 after the high-low (H-L) transition (except the first transition). If after the first H-L transition one of the transponders has the same bit pattern (meaning that the value in its counter 12 matches the increased comparator value (a condition referred to herein as a match), an EOB signal will be generated in response to the detected end-of-burst to trigger the transponder circuit in accordance with the previous description. The circuit thus triggers the oscillation of resonant circuit comprising inductor $L_R$ and capacitor $C_R$, by activation of pluck circuit 26, so that transponder starts the transmission process, as powered by the energy accumulated in $C_C$.

The other transponders wherein the value does not match stop their oscillation as signalled by OSCOFF to effectively short circuit the resonant circuit of each such other transponder wherein the respective pluck circuit is accordingly not activated. Such other transponders thus remain passive, but the supply voltage Vcc remains stored in charge capacitor $C_C$ of each transponder.

If, however, there is no transponder with the same value as sent by the reader, and thus no transponder comparator detects a match, all transponders remain in a stand-by mode as no conditions exist in any transponder to trigger oscillation by the transponder.

During a third phase (3,7) shown in FIG. 5 all transponders are recharged. The H-L transitions 3 to 4, 5 to 6, 7 to 8 each generate a new clock pulse to increase the respective counter's value.

Figure 4A:
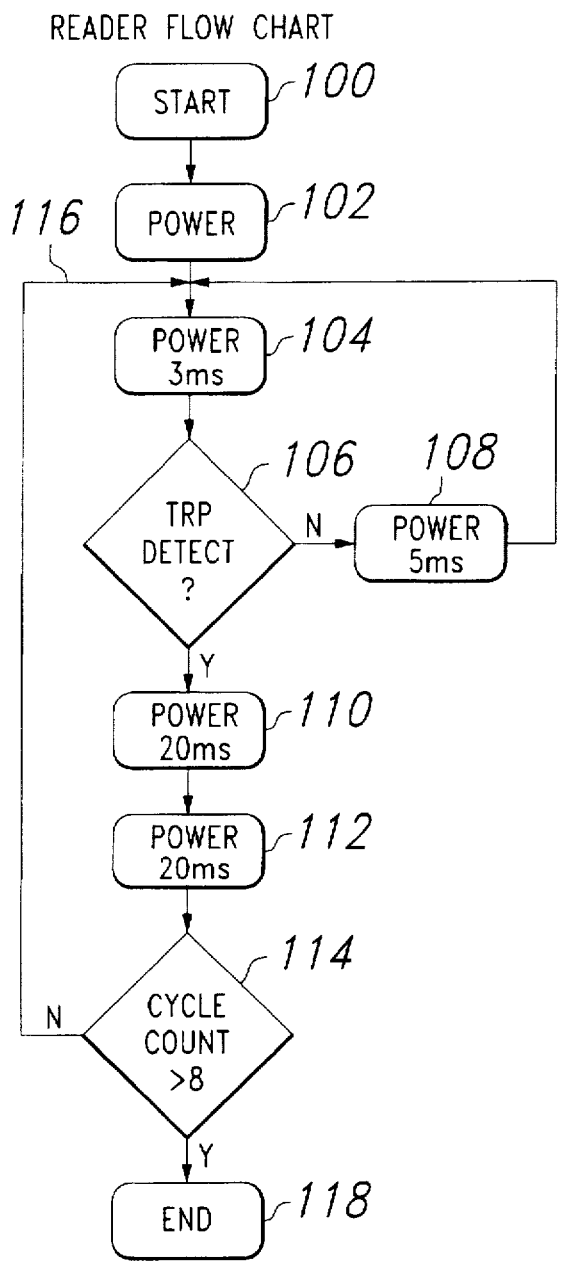

Referring to FIG. 4A, showing steps/sequences of operation as a reader flow diagram, there is first shown a start 100, and from operation proceeds to power step 102, and thereafter a short transponder read step 104 of, e.g., 3 ms duration, during which it will be understood that by reading, the reader is in a receiving mode in which it listens for any a transmission from a transponder. A query 106 follows in which the reader determines if any transponder is detected, and thus may be referred to as checking to see if a transponder is detected. If a transponder response is not detected (N), a short power step 108 of, e.g., 5 ms ensues, followed by transponder read step 104 again. If a transponder response is detected (Y), a longer read step 110 of, e.g., 20 ms provides for transponder reading of data from the transmitting transponder. Then a still longer power step is provided for, e.g., 20 ms as shown at step 112. The cycle count is then queried at 114. If the cycle count is not (N) greater than a value of 8, e.g., as being the predetermined number of transponders to be read, the process loops back as indicated at 116 to step 104 for another cycle. If the cycle count is (Y) greater than a value of 8, the sequence of steps is terminated as shown at end 118. Thus, it will be apparent that if no transponder is detected, the reader will be successively cycled only through steps 102, 104 and 106 in sequence, namely powering, reading and checking, or may be carried out selectively as steps 100, 102, 104 and 106 on an predetermined basis.

Figure 4B:
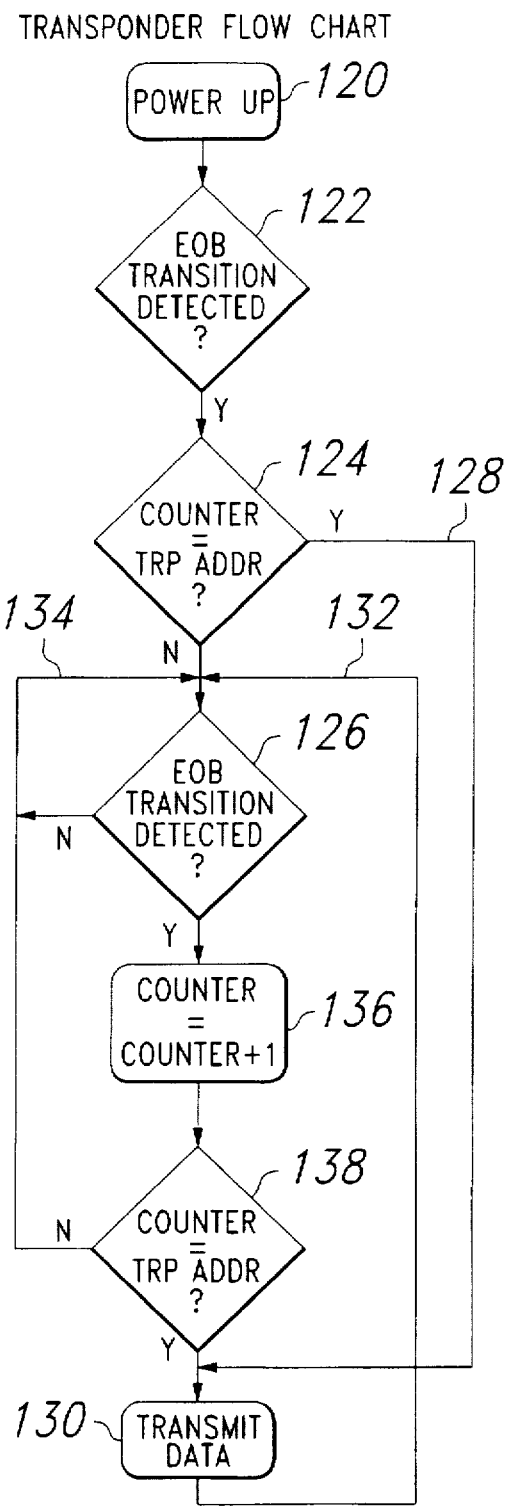

FIG. 4B shows corresponding steps at a transponder. A power-up period is shown as step 120 during which the charge capacitor $C_C$ charges up to provide voltage Vcc. If then at step 122 an EOB signal is detected, operation continues to the determination as represented by step 124 of whether the counter has a count value equal to that corresponding to the transponder address. If not (N), operation proceeds to determining again at decision block 126 whether there is an EOB transition detected. But if yes (Y), the counter has a count value equal to that corresponding to the transponder address, operation proceeds as indicated at 128 to a sequence 130 of transmitting the transponder data to the reader, whereupon the flow then proceeds as indicated at 132 back to query 126 to determine whether there is an EOB transition detected. If not (N), operation is redirected and another query 126 is made. But if yes (Y), operation proceeds from query 126 to step 136 in which counter 12 is incremented by a value of 1 (COUNTER=COUNTER+1). The sequence of operation then queries at 138 whether the counter value equals that corresponding to the transponder address. If not (N), operation is redirected by path 134 to checking again at decision block 126 whether an EOB is detected. If yes (Y), operation proceeds once more to transmit data sequence 130.

Thus, comparing FIGS. 4A and 4B with FIG. 5, it will be understood with reference to FIG. 5 that at phase 1 all transponders are charged up and the reader is ready to receive the transponder telegrams at phase 2. If after a short read period of, e.g., 2–3 ms no signal is detected the reader transmitter starts to power again for a short power step for a period, e.g., 5–10 ms to recharge all transponders in the interrogation field (phase 3). In phase 4 the reader has detected a transponder signal within a 2–3 ms brief read step or segment and thus extends the receive phase to 20 ms. After such an extended receive period or sequence a longer charge up time is necessary by providing an extended power period (e.g., 10–20 ms), as shown in phase 5. The reader continues to power and read, through power and read steps, until the predetermined number of transponders (with corresponding interrogation read cycles) has been reached. Such may for example be 8 or 16 read cycles.

Because system speed is lowered by a greater number of transponders to be interrogated (speed being dependent on the number of the transponders to be detected), the present solution to transponder collision avoidance will be found suitable for specific applications and not all applications.

It is to be further appreciated that resolution is dependent on the number of used bits.

It is noted that in the special case of two transponders in the interrogation field having the same bit pattern, the reader can recognize this occurrence because there will be a field generated by the transponders but not a valid read.

The examples appearing on following pages are illustrative. They indicate exemplary timing sequences considered to be appropriate for conditions of different possible numbers of transponders in the interrogation field. Those skilled in the art may vary timing of steps and sequences to achieve the results of the invention.

EXAMPLE 1

Figure 6:
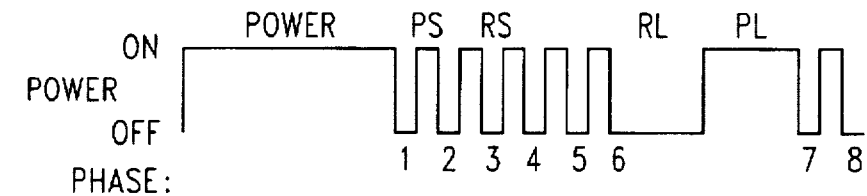
FIG. 6 is a timing diagram with conditions indicative of a number of transponders to be detected, only one transponder being present within the interrogation field.

Referring to FIG. 6, the timing diagram illustrates timing conditions typical where there are, in this example, 8 transponders to be detected but only one transponder is present. The following table illustrates typical sequences and their lengths:

Read Short $(RS)=3$ ms (Table 1)

Read Long $(RL)=20$ ms

Power Short $(PS)=5$ ms

Power Long $(PL)=20$ ms

POWER=50 ms

As accordingly evident from FIG. 6, the sequence of operation proceeds through a power phase of 50 ms and then through a total of 8 subsequent phases, and where in phase 6 RL includes reading of the sixth of 8 transponders, and is followed by PL. The total period T is thus defined by $$T = POWER + RS*3 + PS*5 + RL + PL \quad \text{(Equation 1a)}$$

so that $$T = 50 \text{ ms} + 7*3 \text{ ms} + 6*5 \text{ ms} + 20 \text{ ms} + 20 \text{ ms} = 141 \text{ ms} \quad \text{(Equation 1b)}$$

EXAMPLE 2

Figure 7:
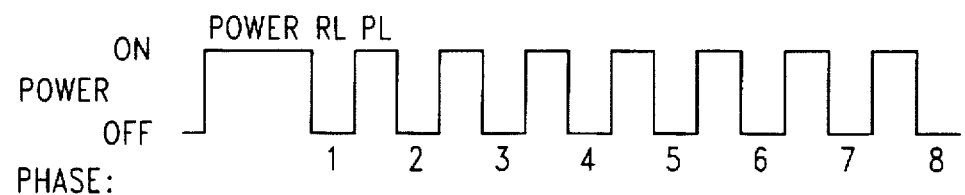
FIG. 7 is a timing diagram with conditions indicative of the same number of transponders to be detected, all of a maximum number of transponders being present, as the system is adjusted according to a desired embodiment.

Referring to FIG. 7, the timing diagram illustrates timing conditions typical where there are, in this example, 8 transponders to be detected and all 8 transponders are present. The total period T is this case similarly $$T = POWER + 8*RL + 7*PL \quad \text{(Equation 2a)}$$

whereby $$T = 50 \text{ ms} + 8*20 \text{ ms} + 7*20 \text{ ms} = 350 \text{ ms} \quad \text{(Equation 2b)}$$

EXAMPLE 3

Similarly, in the event of 16 transponders to be detected and all 16 transponders being present, the total period T is $$T = POWER + 16*RL + 15*PL \quad \text{(Equation 3a)}$$

such that $$T = 50 \text{ ms} + 16*20 \text{ ms} + 15*20 \text{ ms} = 670 \text{ ms} \quad \text{(Equation 3b)}$$

and the sequence of phases will be evident from the pattern generally given by FIG. 7.

SUMMARY

The inventive new system is thus seen to achieve substantial advantages in a HDX and FDX type system for preventing message signal collision of multiple wireless transponders in a wireless interrogation field from interfering with identification of the respective transponder messages, i.e., their so-called telegrams. The transponder collision avoidance system avoids telegram collision with attendant advantages. It involves convenient modification of an existing HDX or FDX-type reader without departing from the existing reader principles of operation except as will be within the province of the skilled artisan to sequence the additional steps, but it still is compatible with existing installations and so achieves desirable backward compatibility with legacy suitability. This also means the modified reader can read existing transponders. As a further advantage, existing transponder designs are readily modified as evident from the foregoing whether for HDX transponder (FIG. 2) or FDX transponder (FIG. 3) configurations, and transponder data can be transmitted reliably to the reader as by using system typical modulation.

In view of the foregoing description of the present invention and various embodiments and methods it will be seen that the several objects of the invention are achieved and other advantages are attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A transponder signal collision avoidance system comprising a reader and a plurality of wireless transponders for being interrogated by the reader within a wireless interrogation field, the reader being adapted for interrogating by transmitting power pulses through a number of cycles corresponding to a number of possible transponders in the field, the number of cycles corresponding to the addresses of each of respective possible transponders, the transponders each being adapted to respond to the reader by transmission only in response to a number of cycles determined by the transponders as corresponding to the address of the respective transponder, whereby to prevent the transponders from transmitting respective messages without interfering with each other.

2. A transponder signal collision avoidance system as set forth in claim 1 wherein each transponder comprises a counter for counting a number of power transmissions by the reader and storing a count value, and circuitry for determining if the stored count identifies the respective transmitter, and circuitry for preventing transmission by the respective transponder if the stored count value does not identify the respective transponder.

3. A transponder signal collision avoidance system as set forth in claim 2 wherein the circuitry for determining if the stored bit pattern identifies the respective transmitter comprises a memory storing a preset address value representing the address of the transponder and a comparator for comparing the a stored count value with the preset address value.

4. A transponder signal collision avoidance system as set forth in claim 3 wherein the circuitry for preventing transmission by the respective transponder if the stored bit pattern does not identify the respective transponder comprises logic circuitry responsive to the comparator for terminating transmission by the respective transponder.

5. A transponder signal collision avoidance system as set forth in claim 4 wherein each transponder comprises a charge capacitor in which received frequency energy is stored when an interrogation signal is received from the reader, the resultant charge in the charge capacitor powering the transponder for operation, the logic circuitry responsive to the comparator for terminating transmission by the respective transponder.

6. A transponder signal collision avoidance system as set forth in claim 5 wherein the logic circuitry comprises a monoflop controlling the transmission status of the transponder in response to the comparator.

7. A transponder signal collision avoidance system as set forth in claim 6 wherein the transponder includes an end-of-burst (EOB) detector for determining the end of a received transmission burst and providing an EOB signal for incrementing the count value stored by the counter upon EOB detections, the comparator providing a comparison match output if the count value matches the preset address value, and the logic circuitry comprises first and second logic gates for controlling the toggling of the monoflop as a function of a comparison match output and the EOB signal.

8. A transponder signal collision avoidance system as set forth in claim 1 wherein the system provides half-duplex operation.

9. A transponder signal collision avoidance system as set forth in claim 1 wherein the system provides full-duplex operation.

10. A transponder signal collision avoidance system as set forth in claim 1 wherein the respective transponders provide their transmissions successively.

11. A method of wireless reader-transponder operation for interrogating possible transponders in a wireless field by the use of a reader and controlling respective ones of the transponder such as to avoid signal collision of transmissions from the respective transponders when interrogated by the reader comprising operating the reader by interrogating by transmitting power pulses through a number of cycles corresponding to a number of possible transponders in the field, the cycles corresponding to the addresses of each of respective possible transponders, and selectively permitting the respective transponders to respond to the reader by transmission only in response to a count of power pulses corresponding to the address of the respective transponder, whereby transponders in the field transmit respective messages sequentially without interfering with each other.

12. A method of wireless reader-transponder operation as set forth in claim 11 comprising storing in each transponder an address value uniquely characteristic of the respective transponder, receiving and storing as a count value a bit pattern representing a number of received power pulses while transmissions are received by the transponder from the reader and comparing the count value during interrogation with the address value for determining if the stored bit pattern identifies the respective transmitter, and preventing transmission by the respective transponder if the stored bit pattern does not identify the respective transponder.

13. A method of wireless reader-transponder operation as set forth in claim 12 including storing in a charge capacitor of each transponder received radio frequency energy provided during said reader power pulses for powering the respective transponder when an interrogation signal is received from the reader.

14. A method of wireless reader-transponder operation as set forth in claim 13 further comprising preventing preventing transmission by the respective transponder if the stored bit pattern during interrogation does not identify the respective transponder.

15. A method of wireless reader-transponder operation as set forth in claim 14 wherein in each transponder the step of comparing the stored count value during interrogation with the address value for determining if the stored count value identifies the respective transmitter provides a match signal if the stored count value identifies the respective transmitter, and further comprising detecting in each transponder an end-of-burst (EOB) of transmission by the reader and signalling same by an EOB signal, initiating a transmission by the transponder upon the presence of both EOB and match signals, and preventing transmission oscillation by the respective transponder if there is an EOB signal without a corresponding match signal.

16. A method of wireless reader-transponder operation as set forth in claim 13 wherein operating the reader comprises providing cycles of operation each having a first power step sending a transponder powering-up signal, and a read step for reading responses from any of the transponders, determining if any transponder response is detected, and then again re-initiating as a new cycle another power step if no response is detected, and subsequently reading responses from any transponder, but if a transponder response is detected extending the cycle by providing a read step longer than the first read step for transponder reading, again providing a further power step, counting cycle count to determine a cycle count, repeating the cycle until as many cycles are completed as correspond to the number of possible transponders.

17. A method of wireless reader-transponder operation as set forth in claim 16 further comprising providing an elongated read period for reading of data during transmission of a transponder during an interrogation cycle in which the respective transmitter provides a match signal if the stored count value identifies the respective transmitter and during which read period data is provided from the respective transponder to the reader.

18. A method of wireless reader-transponder operation as set forth in claim 17 further comprising providing an elongated power period by the reader following the elongated read period.

19. A method of wireless reader-transponder operation for transponder signal collision avoidance as set forth in claim 15 wherein the transponders operate in either HDX or FDX mode, and wherein the step of preventing transmission oscillation means terminating oscillation in the case of an HDX transponder and preventing modulation powered by continuous oscillation in the case of an FDX transponder.

20. A method of wireless reader-transponder operation for transponder signal collision avoidance comprising providing a reader and a plurality of wireless transponders for being interrogated by the reader within a wireless interrogation field, cycling the reader interrogating by transmitting power pulses through a plurality of cycles of interrogation of possible transponders in the field, the cycles calling the addresses of each of respective possible transponders, causing the transponders each to respond to the reader by transmission only in response to a received address of the respective transponder, whereby to prevent the transponders from transmitting respective messages without interfering with each other.

21. A method of wireless reader-transponder operation for transponder signal collision avoidance as set forth in claim 20 wherein the transponders operate in either HDX or FDX mode.

* * * * *